(12) United States Patent
Laigle et al.

(10) Patent No.: US 12,123,333 B2
(45) Date of Patent: Oct. 22, 2024

(54) REDUCTION OF TAILPIPE EMISSIONS FROM GASOLINE INTERNAL COMBUSTION ENGINES WITH A COMBINATION OF SORBENTS

(71) Applicant: SAUDI ARABIAN OIL COMPANY, Dhahran (SA)

(72) Inventors: Emmanuel Laigle, Courbevoie (FR); Christophe Chaillou, Rueil-Malmaison (FR); Caroline Norsic, Rueil-Malmaison (FR); André Nicolle, Nanterre (FR)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/057,375

(22) Filed: Nov. 21, 2022

(65) Prior Publication Data

US 2024/0175382 A1    May 30, 2024

(51) Int. Cl.
*F01N 3/08*    (2006.01)
*B01D 46/00*    (2022.01)
(Continued)

(52) U.S. Cl.
CPC ....... *F01N 3/0842* (2013.01); *B01D 46/0036* (2013.01); *B01D 53/04* (2013.01);
(Continued)

(58) Field of Classification Search
CPC .............. F01N 2250/12; F01N 13/009; F01N 2370/04; F01N 2240/18; F01N 13/0093; F01N 3/0878; F01N 3/101; F01N 3/0814
See application file for complete search history.

(56) References Cited

U.S. PATENT DOCUMENTS 5,258,570 A    11/1993  Skeels et al.
5,379,586 A    1/1995   Honji et al.
(Continued)

FOREIGN PATENT DOCUMENTS

DE    19800654 A1    7/1999
DE    102019204744 A1    8/2020
(Continued)

OTHER PUBLICATIONS

Singh et al., "Emission control from automobiles exhaust using dual absorbent," Conference Series Materials Science and Engineering, Apr. 2021, 2 pages.
(Continued)

*Primary Examiner* — Anthony Ayala Delgado
(74) *Attorney, Agent, or Firm* — Osha Bergman Watanabe & Burton LLP

(57) ABSTRACT

An exhaust treatment system includes an engine, an exhaust line in fluid communication with the engine, a three-way catalyst downstream of the engine on the exhaust line, a particulate filter downstream of and proximate to the three-way catalyst on the exhaust line, and a sorbent unit comprising a first sorbent and a second sorbent downstream of the three-way catalyst and the particulate filter on the exhaust line. The first sorbent and the second sorbent are proximate to a tailpipe of the exhaust line. A method of treating an exhaust emission from an internal combustion engine during an engine cold-start is also described.

7 Claims, 12 Drawing Sheets

(51) Int. Cl.
    *B01D 53/04*     (2006.01)
    *B01D 53/94*     (2006.01)
    *F01N 3/031*     (2006.01)
    *F01N 3/10*     (2006.01)
    *F01N 3/28*     (2006.01)
    *F01N 11/00*     (2006.01)
    *F01N 13/00*     (2010.01)

(52) U.S. Cl.
    CPC ..... *B01D 53/9454* (2013.01); *B01D 53/9495* (2013.01); *F01N 3/031* (2013.01); *F01N 3/101* (2013.01); *F01N 3/2825* (2013.01); *F01N 11/002* (2013.01); *F01N 13/009* (2014.06); *B01D 2253/102* (2013.01); *B01D 2253/108* (2013.01); *B01D 2259/4566* (2013.01); *B01D 2279/30* (2013.01); *F01N 2370/04* (2013.01)

(56) References Cited

U.S. PATENT DOCUMENTS

| | | | |
|---|---|---|---|
| 7,753,034 | B2 | 7/2010 | Hoke et al. |
| 8,637,426 | B2* | 1/2014 | Hoke .................. F01N 3/103 |
| | | | 502/333 |
| 9,333,490 | B2* | 5/2016 | Kazi .................. F01N 3/103 |
| 11,583,834 | B2* | 2/2023 | Cheng .................. B01D 53/945 |
| 2002/0006363 | A1 | 1/2002 | Feeley et al. |
| 2004/0000137 | A1 | 1/2004 | Ueno et al. |
| 2004/0044262 | A1 | 3/2004 | Yang et al. |
| 2009/0193796 | A1* | 8/2009 | Wei .................. F01N 3/0814 |
| | | | 60/299 |
| 2010/0209321 | A1* | 8/2010 | Gandhi .................. F01N 3/0814 |
| | | | 423/213.2 |
| 2011/0072801 | A1* | 3/2011 | Lupescu .................. F02M 26/24 |
| | | | 60/287 |
| 2011/0200505 | A1* | 8/2011 | Cavataio .................. B01J 23/72 |
| | | | 422/171 |
| 2016/0160723 | A1* | 6/2016 | Thomas .................. F01N 3/0232 |
| | | | 60/274 |
| 2017/0167336 | A1* | 6/2017 | Park .................. F01N 3/0814 |
| 2018/0038252 | A1 | 2/2018 | Yang et al. |
| 2019/0360416 | A1* | 11/2019 | Nee .................. F01N 13/009 |
| 2020/0149449 | A1* | 5/2020 | Park .................. B01D 53/9495 |
| 2020/0248603 | A1* | 8/2020 | Joo .................. F01N 3/035 |
| 2020/0248607 | A1 | 8/2020 | Joo et al. |
| 2021/0102486 | A1 | 4/2021 | Sung et al. |

FOREIGN PATENT DOCUMENTS

| | | |
|---|---|---|
| DE | 102019219115 A1 | 6/2021 |
| EP | 460542 B1 | 1/1995 |
| EP | 0640381 A1 | 3/1995 |
| EP | 716877 A1 | 6/1996 |
| EP | 1243766 B1 | 7/2008 |
| JP | H11148344 A | 6/1999 |
| JP | 2000303825 A * | 10/2000 |
| JP | 2004084517 A | 3/2004 |
| JP | 2007247441 A * | 9/2007 |
| JP | 2009264116 A | 11/2009 |
| WO | 2014191640 A1 | 12/2014 |
| WO | 2018185666 A1 | 10/2018 |
| WO | 2020069549 A1 | 4/2020 |
| WO | 2022167431 A1 | 8/2022 |

OTHER PUBLICATIONS

International Search Report and Written Opinion issued in Application No. PCT/US2023/080549, mailed on Mar. 21, 2024 (14 pages).

* cited by examiner

REDUCTION OF TAILPIPE EMISSIONS FROM GASOLINE INTERNAL COMBUSTION ENGINES WITH A COMBINATION OF SORBENTS

BACKGROUND

Environmental concerns and government regulations have led to efforts focused on improving the removal of noxious combustion by-products and exhaust pollutants from vehicle engine exhaust gases. Common exhaust lines are equipped with several components in order to reduce pollutants from the high concentrations observed directly from the engine to low concentrations at the tailpipe. Presently, a catalyst to treat gaseous pollutants including carbon monoxide (CO), nitrogen oxides (NOx), and unburned hydrocarbons (HC) as well as a particulate filter to collect and burn solid pollutants such as soot are included on vehicle exhaust lines. For example, commonly used three-way catalysts include precious metals to efficiently convert exhaust gas pollutants to harmless components including water ($H_2O$), nitrogen ($N_2$), and carbon dioxide ($CO_2$).

Although three-way catalysts often fully reduce $NO_x$ to ammonia ($NH_3$), another harmful gaseous pollutant, a large portion of the exhaust emissions are produced during the cold start phase, resulting from the low conversion efficiency of many exhaust gas purifying catalysts in cold conditions. As such, catalysts are often heated during the cold start phase to increase pollutant conversion and reduce noxious emissions. Nevertheless, under cold start conditions, residual pollutants often remain, making the removal of such pollutants a highly desirable goal.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an exhaust treatment system that includes an engine, an exhaust line in fluid communication with the engine, a three-way catalyst downstream of the engine on the exhaust line, a particulate filter downstream of and proximate to the three-way catalyst on the exhaust line, and a sorbent unit comprising a first sorbent and a second sorbent downstream of the three-way catalyst and the particulate filter on the exhaust line. The first sorbent and the second sorbent are proximate to a tailpipe of the exhaust line.

In another aspect, embodiments disclosed herein relate to a method of treating an exhaust emission from an internal combustion engine during an engine cold-start. The method includes providing an exhaust emission from the internal combustion engine to an exhaust line during the engine cold-start and passing the exhaust emission through a three-way catalyst, where three-way catalyst has not reached a light-off temperature, thereby producing a three-way catalyst emission. The method also includes passing the three-way catalyst emission from the three-way catalyst to a particulate filter on the exhaust line, thereby producing a particulate filter emission, passing the particulate filter emission to a sorbent unit comprising a first sorbent and a second sorbent to produce an untreated and filtered emission, and adsorbing one or more gases from the untreated and filtered emission in the sorbent unit, thereby producing an adsorbed emission.

Other aspects and advantages of the claimed subject matter will be apparent from the following description and the appended claims.

DETAILED DESCRIPTION

Embodiments disclosed herein relate to an exhaust treatment system of an engine exhaust line. One or more embodiments may also relate to a sorbent unit of the exhaust treatment system. The exhaust treatment system of one or more embodiments may reduce the release of gaseous pollutants including, but not limited to, hydrocarbons (HCs), nitrous oxides ($NO_x$), carbon dioxide ($CO_2$), or combinations thereof. The exhaust treatment system may reduce the release of gaseous pollutants from a tailpipe of an exhaust line during an engine cold-start phase.

Figure 1:
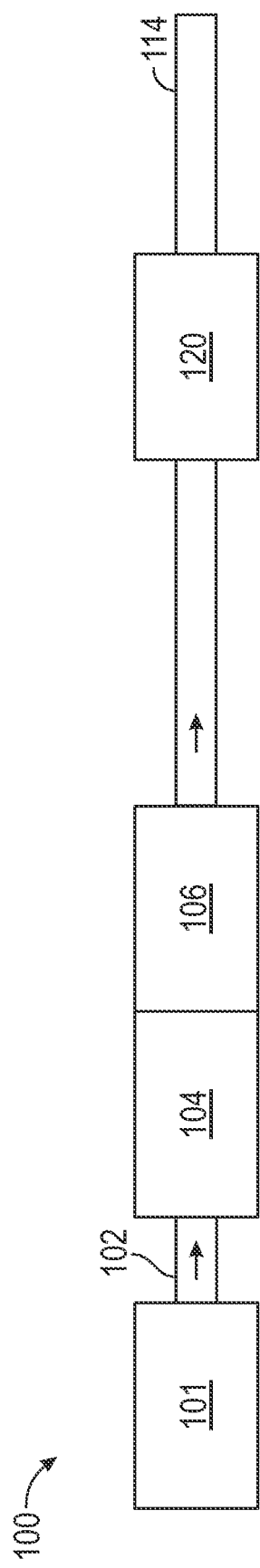
FIG. 1 is a schematic of an exhaust treatment system in accordance with one or more embodiments.

FIG. 1 is a schematic of an exhaust treatment system of one or more embodiments. In such embodiments, the exhaust treatment system 100 includes an engine 101 and an exhaust line 102 in fluid communication with an emission outlet of the engine 101. The engine 101 may be an internal combustion engine, a gasoline direct injection (GDI) engine, or a port fuel injection (PFI) engine. The exhaust line 102 is in fluid communication with a three-way catalyst 104 located proximate to and downstream of the engine, a particulate filter 106 downstream of and proximate to the three-way catalyst, and a sorbent unit 120. As shown in FIG. 1, the sorbent unit 120 is located proximate to a tailpipe 114 of the exhaust line 102. The arrows in FIG. 1 show the direction of flow of the exhaust.

Figure 2:
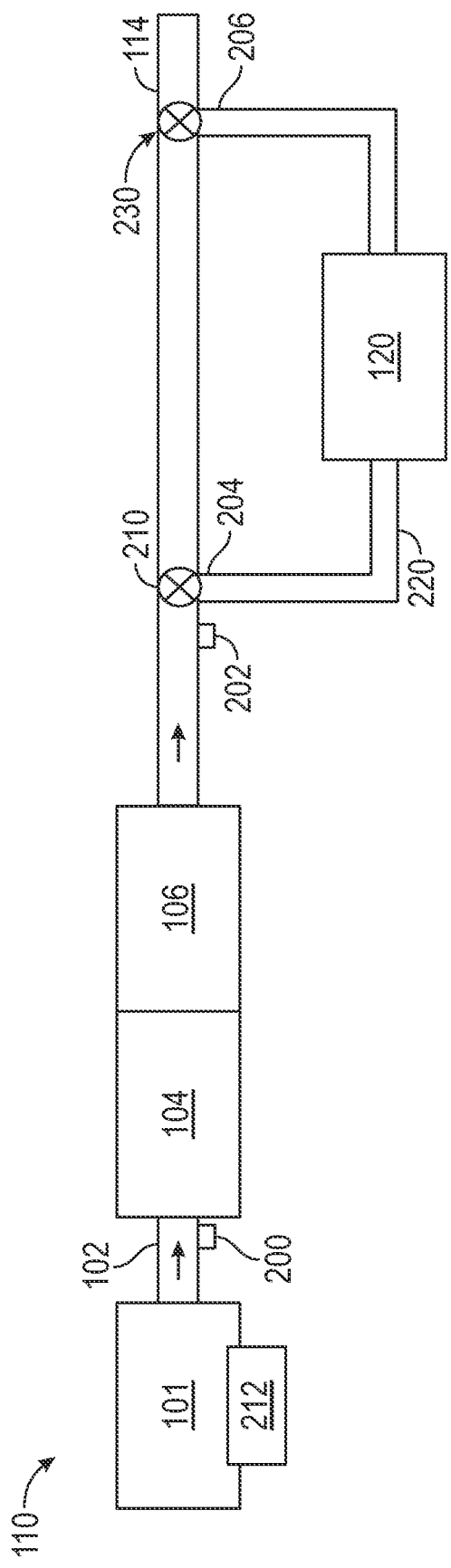
FIG. 2 is a schematic of an exhaust treatment system in accordance with one or more embodiments.

FIG. 2 is a schematic of an exhaust treatment system of one or more embodiments. In one or more embodiments, an exhaust treatment system 110 includes an engine 101, an exhaust line 102, a three-way catalyst 104, a particulate filter 106 as described above. As shown in FIG. 2, a sorbent unit 120 is located on a bypass line 220 of the exhaust treatment system 110. The bypass line 220 is in fluid communication with the exhaust line 102 via a bypass inlet 204 and a bypass outlet 206. The bypass inlet 204 includes a bypass inlet valve 210, and the bypass outlet includes a bypass outlet valve 230. The bypass line 220 is provided to reduce back pressure of the exhaust line 102.

In one or more embodiments, the exhaust treatment system 110 includes a first sensor 200, a second sensor 202, or both. The first sensor is located proximate to and upstream of the three-way catalyst 104 as shown in FIG. 2. The first sensor 200 may be a lambda sensor, a temperature sensor, a pressure sensor, or combinations thereof. In one or more particular embodiments, the first sensor may measure a temperature of an exhaust emission.

As one of ordinary skill may appreciate, the lambda sensor that measures the level of oxygen in exhaust emissions may be disposed on the exhaust line. A lambda sensor may be disposed downstream of and proximate to an engine outlet, a lambda sensor may be disposed downstream of and proximate to the three-way catalyst, a differential pressure sensor may be disposed before and/or after the particulate filter, or combinations thereof. In one or more particular embodiments, one or more temperature sensors may be disposed upstream and/or downstream of the three-way catalyst.

The second sensor 202 is located upstream of the exhaust bypass line 220. In one or more embodiments, the second sensor 202 may be a temperature sensor, a pressure sensor, or both. The second sensor 202 may measure a temperature of an exhaust emission that has passed through catalyst 104 and filter 106, an internal pressure of the exhaust flow line downstream of the filter and upstream of the bypass inlet 204, or both.

An electronic control unit 212 is in electronic communication with the first sensor, a second sensor, a bypass inlet valve, a bypass outlet valve, or combinations thereof. In one or more embodiments, the electronic control unit opens, closes, or actuates the bypass inlet valve 210, the bypass outlet valve 230, or both. In one or more particular embodiments, the second sensor 202 may transmit a temperature to the electronic control unit 212. The transmitted temperature may be above a threshold temperature for maximum adsorption of molecules of the sorbent unit. The electronic control unit may close the bypass inlet valve if the transmitted temperature from sensor 202 is above the threshold temperature.

In one or more embodiments, the three-way catalyst 104 is located downstream of the engine 101 on the exhaust line 102 as shown in FIGS. 1 and 2. As one of ordinary skill may appreciate, the three-way catalyst 104 may be any catalyst to treat gaseous pollutants such as carbon monoxide (CO), unburned hydrocarbons (HC), nitrogen oxides ($NO_x$), or combinations thereof. A catalyst may include a honeycomb structure with open channels. The honeycomb structure may include a substrate (or "monolith") supporting an active phase, made of cordierite or metal, a washcoat to increase contact between a surface of an open channel with components of exhaust emission, such as gaseous pollutants, and one or more precious metals embedded in the washcoat. In one or more embodiments, the one or more precious metals are necessary to accelerate the transformation of gaseous pollutants of the exhaust emissions.

Figure 3:
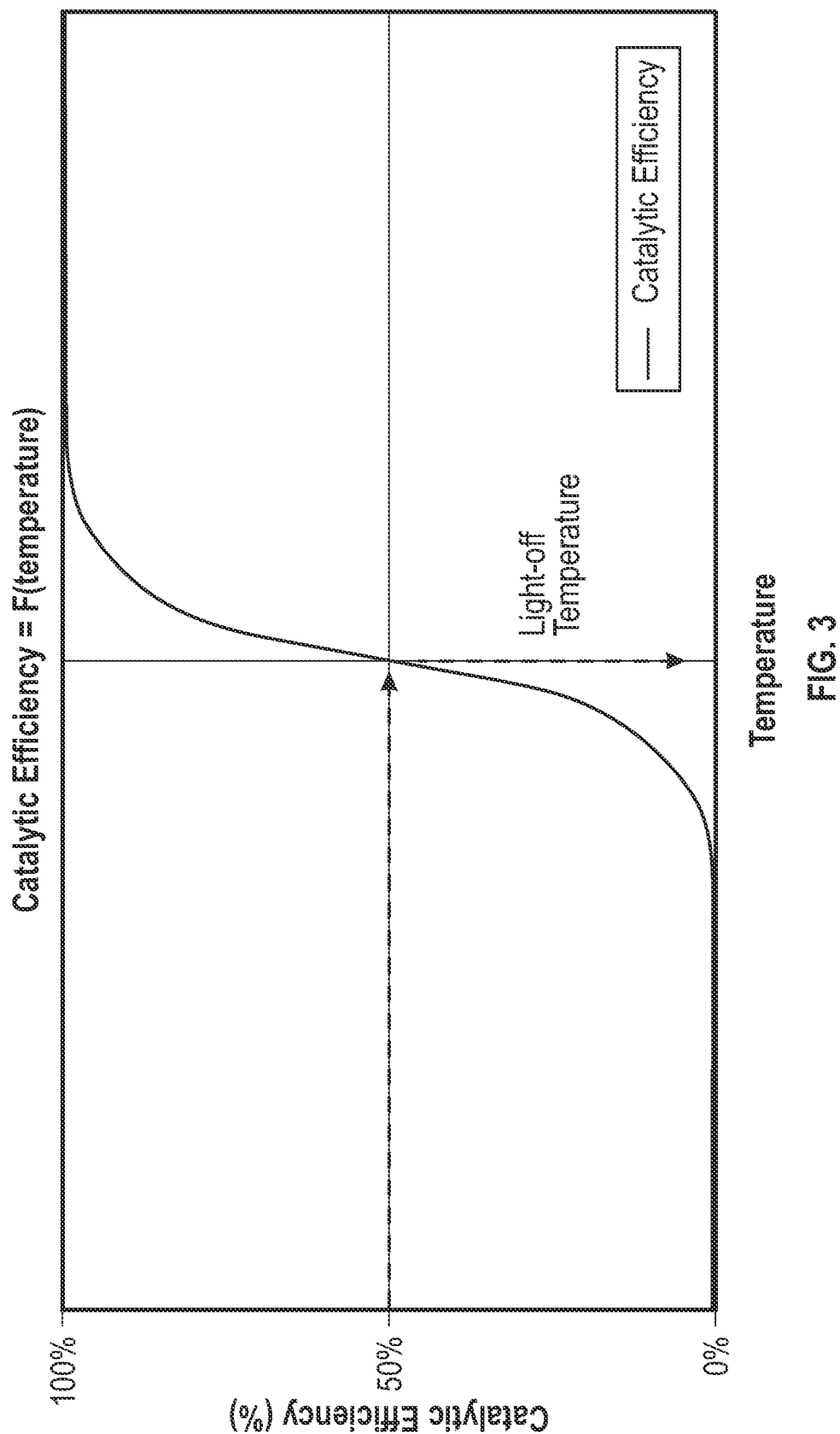
FIG. 3 is a graph of temperature versus catalytic efficiency showing a graphical representation of a light-off temperature in accordance with one or more embodiments.

Catalysts, such as the three-way catalyst 104, have a conversion efficiency as a function of temperature. A non-limiting example showing conversion efficiency behavior is shown in FIG. 3, which displays a graphical representation of the conversion efficiency of a catalyst as a function of temperature. As shown in FIG. 3, if the temperature of the catalyst is too low, the catalyst may be deactivated such that conversion efficiency is low, for example, about 50% or less. In such instances, a "light-off" temperature may refer to a temperature when the catalytic efficiency is about 50%.

The particulate filter 106 treats an exhaust emission such that solid pollutants, also known as soots or particulate matter, are trapped and stored in the particulate filter. In one or more embodiments, the particulate filter may be located downstream of and proximate to the three-way catalyst on the exhaust line. The particulate filter may be adapted to consider emission regulations, such as regulations directed toward the release of a particulate mass and particulate. When the particulate filter 106 with trapped soots achieves an elevated temperature and sufficient oxygen concentration, the particulate filter further transforms the trapped soots to gaseous carbon dioxide. In such embodiments, the elevated temperature regenerates the particulate filter 106 by oxidizing the trapped soots. The particulate filter may be regenerated via the post-injection of fuel, via burning on the catalyst, with a dedicated combustion mode to increase the temperature of the exhaust, or combinations thereof. The dedicated combustion mode to increase the temperature of the exhaust may be provided by reducing the thermal efficiency of the engine.

The sorbent unit 120 is located downstream of the three-way catalyst 104 and the particulate filter 106 on exhaust line 102 as described above. In such embodiments, the sorbent unit 120 traps gaseous compounds of an exhaust emission, such as gaseous pollutants. The exhaust emission may have been treated by units upstream on the exhaust line 102, such as the three-way catalyst 104, the particulate filter 106, or both. In some embodiments, the exhaust emission may have passed through treatment units upstream of the sorbent unit without treatment, such as during an engine cold-start phase.

In one or more embodiments, the sorbent unit 120 traps gaseous compounds of an exhaust emission via adsorption on to one or more sorbents. The sorbent unit 120 may trap gaseous compounds of an exhaust emission via adsorption on to two or more sorbents. The sorbent unit 120 may adsorb gaseous compounds of an exhaust emission via adsorption on to three or more sorbents. The gaseous compounds of an exhaust emission may be adsorbed onto storage sites of the sorbents. In one or more embodiments, an exhaust emission received by the sorbent unit 120 may include gaseous compounds, such as gaseous pollutants, that were passed through one or more treatment units located upstream on the exhaust line.

In such embodiments, the exhaust emission may be an untreated exhaust emission, a treated exhaust emission, or a partially treated exhaust emission. As one of ordinary skill may appreciate, "treatment" of an exhaust emission via one or more treatment units of an exhaust line may include trapping of a gaseous compound, trapping of a solid particulate, transforming a gaseous compound, or combinations thereof. A "treated" exhaust emission refers to an exhaust emission that has been treated by at least a three-way catalyst and a particulate filter of the exhaust line. A "partially treated" exhaust emission refers to an exhaust emission that has been treated by a three-way catalyst or a particulate filter of the exhaust line. An "untreated" exhaust emission refers to an exhaust emission that has not been treated by treatment units of an exhaust line upstream of the sorbent unit.

Figure 4A:
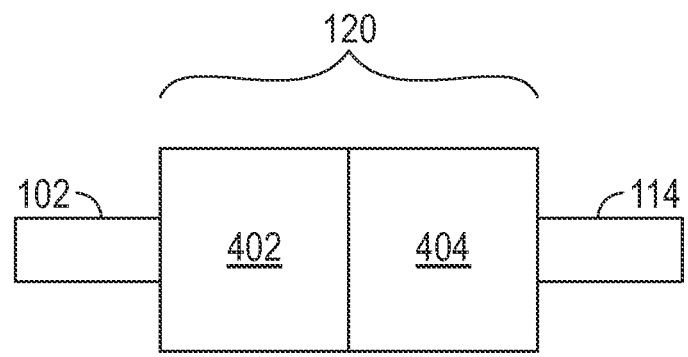
FIG. 4A is a schematic of a sorbent unit including a first sorbent layer and a second sorbent layer in accordance with one or more embodiments.
Figure 4B:
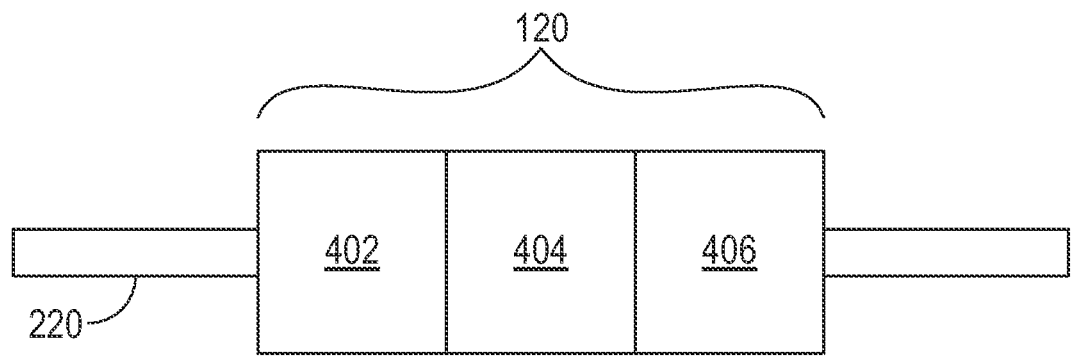
FIG. 4B is a schematic of a sorbent unit including a first sorbent layer, a second sorbent layer, and a third sorbent layer in accordance with one or more embodiments.

The sorbent unit 120 may include multiple sorbent layers as shown in FIGS. 4A and 4B. FIGS. 4A and 4B show a sorbent unit including at least two sorbents according to one or more embodiments. In one or more embodiments, the sorbent unit includes a mixture of sorbents such that no distinct sorbent layer is present. In one or more embodiments, the sorbents are provided in distinct and separate layers as shown in FIGS. 4A and 4B. In one or more particular embodiments, the distinct and separate sorbent layers avoid competitive adsorption between molecules, thereby maximizing adsorption efficiency.

As shown in FIG. 4A, the sorbent unit 120 proximate to tailpipe 114 includes a first sorbent 402 and a second sorbent 404 on exhaust line 102. In such embodiments, the first sorbent 402 is upstream of the second sorbent 404 of the sorbent unit 120. The sorbent unit 120 of FIG. 4A may include a third sorbent (not shown) downstream of the second sorbent 404. In one or more embodiments, the sorbent unit 120 located on bypass line 220 of FIG. 4B includes a first sorbent 402 and a second sorbent 404. The sorbent unit 120 of FIG. 4B may include a third sorbent 406 downstream of the first sorbent 402 and second sorbent 406.

In one or more embodiments, the first sorbent 402 is a sorbent with lower storage capacity and the second sorbent 404 is a sorbent with higher storage capacity as compared to the first sorbent 402. The first sorbent 402 may include strong storage sites such that no desorption occurs without an increase in temperature. The second sorbent 404 may include both strong and weak storage sites. The strong and weak storage sites of the second sorbent 404 may provide partial desorption of gaseous emissions without a temperature increase. In one or more embodiments, the first sorbent may exhibit a higher affinity for larger molecules, such as toluene, relative to the second sorbent. In one or more embodiments, the first adsorbent includes activated carbon. The activated carbon may be a commercially available activated carbon, such as activated carbon NORIT® 3070D (available from NORIT Activated Carbon).

The second sorbent may have a higher affinity for smaller molecules, such as pentanes and ammonia, relative to the first sorbent. In one or more embodiments, the second sorbent may be a zeolite. The zeolite may be selected from the group consisting of be a pentasil Zeolite Socony Mobil-5 zeolite such as ZSM-5, a Beta (BEA) zeolite, a Linde Type A zeolite such as 5A zeolite, a faujasite zeolite, and combinations thereof. The faujasite zeolite may include a relatively low silica to aluminum ratio (i.e., less than 2:1) synthetic material such as Zeolite X. The faujasite zeolite may include a high silica to aluminum ratio (i.e., greater than 2:1) such as Zeolite Y. The faujasite zeolite may include a 13X zeolite.

The zeolite may include a commercially available zeolite. The commercially available zeolite may include a commercially available Pentail zeolite such as a CuZSM5. The commercially available CuZSM5 zeolite may include a copper exchanged CZp 30 from Clariant.

In one or more embodiments, the third layer sorbent layer is selected for its ability to trap the molecules remaining after the two first layers. The third sorbent layer may be a material selected based on the molecules present in the emissions after the first and second sorbent layers, and a material capable of adsorbing the remaining molecules can be selected. A non-limiting example of a third sorbent layer material is a zeolite, such as a palladium-based Beta zeolite, which can store nitric oxide and carbon monoxide, a ruthenium/sodium-based Y-zeolite, which can store nitric oxide.

In one or more embodiments, the third sorbent includes a commercial catalyst. The commercial catalyst may be configured to reduce NOx from a gaseous emission. The commercial catalyst may include an automotive serial catalyst such as an automotive serial catalyst obtained from Johnson Matthey. The commercial catalyst may have the catalytic feature (i.e., platinum group metals) deactivated or removed such that molecules are only stored on the sorbent of the catalyst. In such embodiments, the commercial catalyst stores one or more molecules beyond NOx emissions.

In one or more embodiments, a known storage capacity of the sorbent unit is provided and estimated based on an estimated value of emissions released during an engine cold-start. In one or more embodiments, the known storage capacity is measured during a design process of the sorbent unit, such as with synthetic gas bench experiments, flow gas bench experiments, or combinations thereof.

In one or more embodiments, a storage capacity may be estimated via analysis of an adsorption/desorption profile. For example, when the material is saturated with a molecule, the inlet injection is stopped and weak sites may be detected. If no weak sites are present, there is no desorption observed in the profile trace. However, weak sites may be present if desorption is detected. When the desorption is complete from weak sites, such that the outlet trace reaches baseline, the desorbed quantity may be calculated, which relates to the number of weak sites. The desorbed quantity may be the capacity of weak sites. As such, strong sites may be derived from the subtraction of the calculated amount of weak sites from the total adsorption. In such embodiments, the strong sites capacity may also be the total desorption capacity when the temperature is increased, such as in regions 506 and 606 of FIG. 5 and FIG. 6, respectively.

In one or more particular embodiments, a molecular sensor is disposed on the exhaust line proximate to the sorbent unit. In such embodiments, the molecular sensor may be a sensor 202 described above. The molecular sensor may detect an amount of one or more molecules selected from the group consisting of $NO_x$, $NH_3$, hydrocarbons, $CO_2$, and combinations thereof. In one or more embodiments, the molecular sensor is a storage capacity sensor.

Figure 4C:
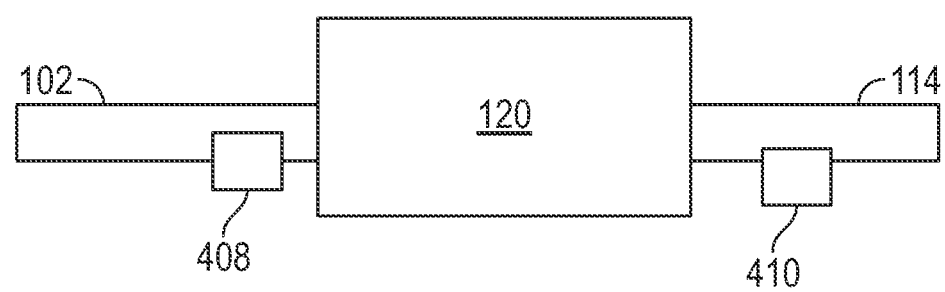
FIG. 4C is a schematic of a sorbent unit including a first storage capacity sensor and a second storage capacity sensor in accordance with one or more embodiments.

In one or more embodiments, a first storage capacity sensor is disposed downstream of the sorbent unit 120, a second storage capacity sensor is disposed upstream of the sorbent unit 120, or both. In one or more embodiments, a first storage capacity sensor 410 and a second storage capacity sensor may be disposed as shown in FIG. 4C. In such embodiments, the second storage capacity sensor 408 includes a known storage capacity value. In one or more embodiments, the sorbent unit 120 may be regenerated or replaced when the storage capacity reaches a value of about 70% or above.

In one or more embodiments, the sorbent unit 120 is located in a cartridge. Embodiments in which a storage capacity of the sorbent unit 120 is reached, the cartridge may be removed and replaced. The cartridge may be removed and/or replaced during routine engine maintenance, such as during an engine oil change.

In one or more embodiments, the sorbent unit 120 is regenerated via absorption of thermal energy from the exhaust gas such that adsorbed emissions are released. The released emissions may be redirected to the three-way catalyst of the exhaust line via a recycled emissions line (not shown).

Method of Selecting Sorbents

In one or more embodiments, a sorbent material may be evaluated for use as sorbent. In one or more embodiments, a sorbent material may be evaluated for use as a first sorbent, a second sorbent, or a third sorbent.

In one or more embodiments, the adsorption capacity of a sorbent material may be characterized via treatment of a sorbent material with an alternating emission stream injection while measuring an outlet stream of from a sorbent material. In one or more embodiments, the strength of storage sites of a sorbent material may be estimated via measuring the desorption of a molecule from a sorbent material. In such embodiments, the desorption of a molecule from a sorbent material may be measured when the sorbent material is saturated at constant temperature.

In one or more embodiments, a sorbent may be characterized via synthetic gas bench experiments, flow gas bench experiments, computational modelling, or combinations thereof. As one of ordinary skill may appreciate, computational modelling may be performed with a computer and computational software known to those skilled in the art.

In one or more embodiments, computational modelling may be built using physical equations, chemical equations, or both. In one or more embodiments, the computational model built is a zero dimension (0D) model. The 0D model may consider the reactor as a singular point. The 0D model may neglect parameters, such as competitive adsorption processes, possible inhibition phenomena, neglected transport, mass transfers, heat transfers, or combinations thereof. In such embodiments, heat balance may be neglected due to the high dilution of pollutants in the diluent gas.

In one or more particular embodiments, the model may be built with the assumption that each storage site correlates to a single molecule from an emission stream.

In one or more embodiments, the computational model is built following a Langmuir kinetic formalism. In such embodiments, for a given material j, it is assumed that there are multiple storage sites on the material j. At each step of the Langmuir kinetic formalism, a raw adsorption rate for storage site i, a final adsorption rate, a desorption rate for the storage site i, a molar quantity of molecules adsorbed onto the material, and a surface coverage for the storage site i may be calculated.

The raw adsorption rate ($v_{ads\ raw_i}$) for the storage site i may be calculated using Equation 1, as follows.

$$v_{ads\ raw_i} = k_{0_{ads_i}} P_j (1 - \theta_i) \qquad \text{Eqn. 1}$$

where $$k_{0_{ads_i}}$$

is the rate constant for adsorption of site i; $P_j$ is the partial pressure of species j; and $\theta_i$ is the surface coverage of site i.

If the total adsorption rate is calculated as described above, the inlet flow concentration $Q_j$ and adsorption rates are normalized to avoid over-consumption. The final adsorption rate ($v_{ads_i}$) for the storage site i may be calculated using Equation 2, below.

$$v_{ads_i} = \begin{cases} \text{if } \sum_i v_{ads\ raw_i} > Q_j & v_{ads_i} = Q_j \cdot \dfrac{v_{ads\ raw_i}}{\sum_i v_{ads\ raw_i}} \\ \text{if } \sum_i v_{ads\ raw_i} < Q_j & v_{ads_i} = v_{ads\ raw_i} \end{cases} \qquad \text{Eqn. 2}$$

The desorption rate for the storage site i ($v_{des_i}$) may be calculated using a Temkin-type rate expression as shown in Equation 3.

$$v_{des_i} = k_{0_{des_i}} e^{-\dfrac{E_{a_{des_i}}(1 - \alpha_i \theta_i)}{RT}} \theta_i \qquad \text{Eqn. 3}$$

where $$k_{0_{des_i}}$$

is the rate constant for desorption of site i;

$$E_{a_{des_i}}$$

is the activation energy for desorption of site I; $\alpha_i$ is a constant to describe the dependence of the activation energy of desorption from the surface coverage $\theta_i$ of site i; R is the ideal gas constant; and T is the reactor temperature.

The surface coverage of site i ($\theta_i$) may be assumed to be locally homogenous. In such embodiments, the surface coverage $\theta_i$ may be defined as a ratio of molar quantity of a molecule stored ($N_i$) to total molar capacity ($N_{i_{max}}$) as shown in Equation 4, below.

$$\theta_i = N_i / N_{i_{max}} \qquad \text{Eqn. 4}$$

The total molar quantity stored on the entire sorbent material ($N_{tot}$) and for each storage site ($N_i$) may be defined by Equations 5 and 6.

$$N_{tot} = \Sigma_i N_i \qquad \text{Eqn. 5}$$

$$N_i = \int v_{ads_i} - v_{des_i} \qquad \text{Eqn. 6}$$

where $v_{ads_i}$ and $v_{des_i}$ are as defined above. The total molar quantity stored on the entire sorbent material ($N_{tot}$) may be the sum of the molar quantity of molecules stored on each storage site ($N_i$) of Eqn. 6. The molar quantity of molecules stored on each storage site ($N_i$) is the integral of the $v_{des_i}$ subtracted from $v_{ads_i}$.

In one or more embodiments, a dual sorbent system may be characterized using the computational model derived from Eqns. 1-6, described above, along with experimental methods. For example, the computational model may be developed using values determined from adsorption/desorption experiments, such as with synthetic gas bench and/or flow gas bench experiments. Parameters such as the number of storage sites, the total storage capacity, the storage capacity of each storage site, or combinations thereof may be determined via experimental methods.

In such embodiments, the parameters determined via experimental methods may be used to calibrate a computational model built from Eqns. 1-6, above. For example, parameters including $$E_{a_{des_i}}, \alpha_i, k_{0_{des_i}}, \text{ and } k_{0_{ads_i}}$$

may then be calculated using the equations described above. If available, a value of one or more parameters described above may be obtained from literature. In one or more particular embodiments, an algorithm may be employed to fit the adsorption curve, desorption curve, or both.

Figure 5:
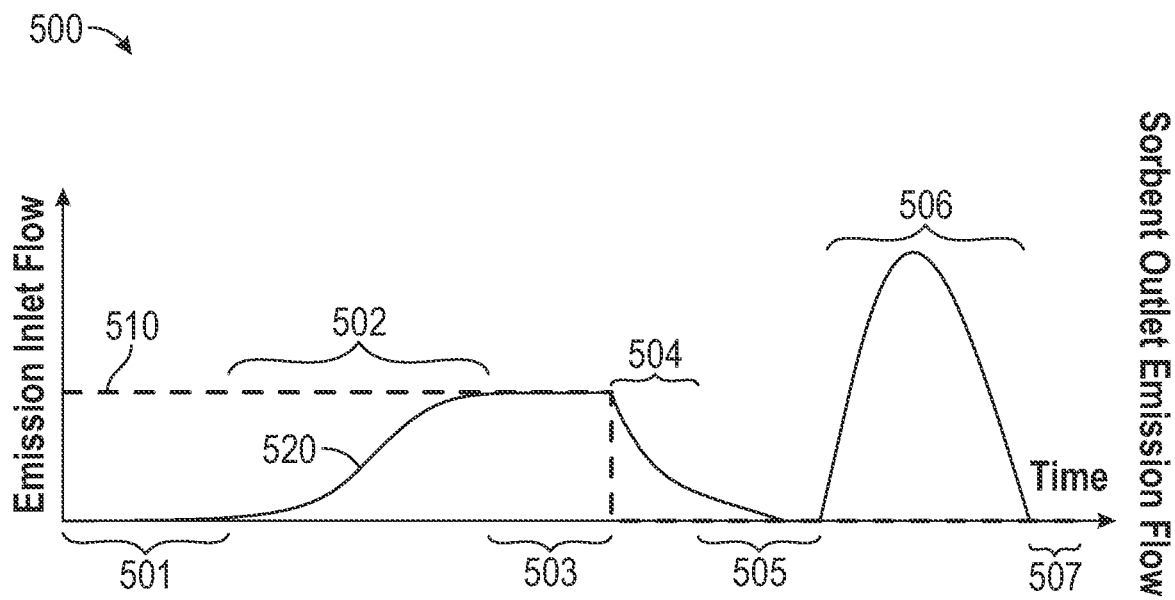
FIG. 5 is a graphical representation of an adsorption/desorption profile of a second sorbent, an emission inlet, ad temperature versus time in accordance with one or more embodiments.

In one or more embodiments, the first sorbent may be selected based on a first sorbent adsorption/desorption profile 500 as shown in FIG. 5. In region 501, a single molecule gas injection 510 is introduced to a first sorbent. A first sorbent outlet emission may be monitored. The first sorbent may include strong storage sites and weak storage sites. Molecules may be injected with the single molecule gas injection 510 in region 501. Injected molecules may be stored on both strong and weak storage sites in region 502. Desorption from weak storage sites may also occur in region 502. In such instances, molecules may be adsorbed again on additional weak storage sites and/or on additional storage sites. Both the strong storage sites and weak storage sites may adsorb injected molecules such that the adsorption capacity of the first sorbent is gradually achieved in region 503.

In region 504 of FIG. 5, a single molecule gas injection 510 is stopped. Some molecules may be observed or detected downstream of the emission outlet of the first sorbent as indicated by the gradual decrease in the first sorbent outlet emission 520 in regions 504 and 505 while the temperature remains constant. The observed or detected molecules may be from the emission stream injection, a result of molecule desorption from weak storage sites, or both. In one or more embodiments in which the adsorbed molecules are desorbed from weak storage sites, minimal desorption is observed at the end of region 505. With an increase in temperature in region 506, molecules adsorbed on to strong storage sites and weak storage sites are desorbed. As molecules are released from storage sites, the storage capacity of the first sorbent decreases to baseline in region 507.

Figure 6:
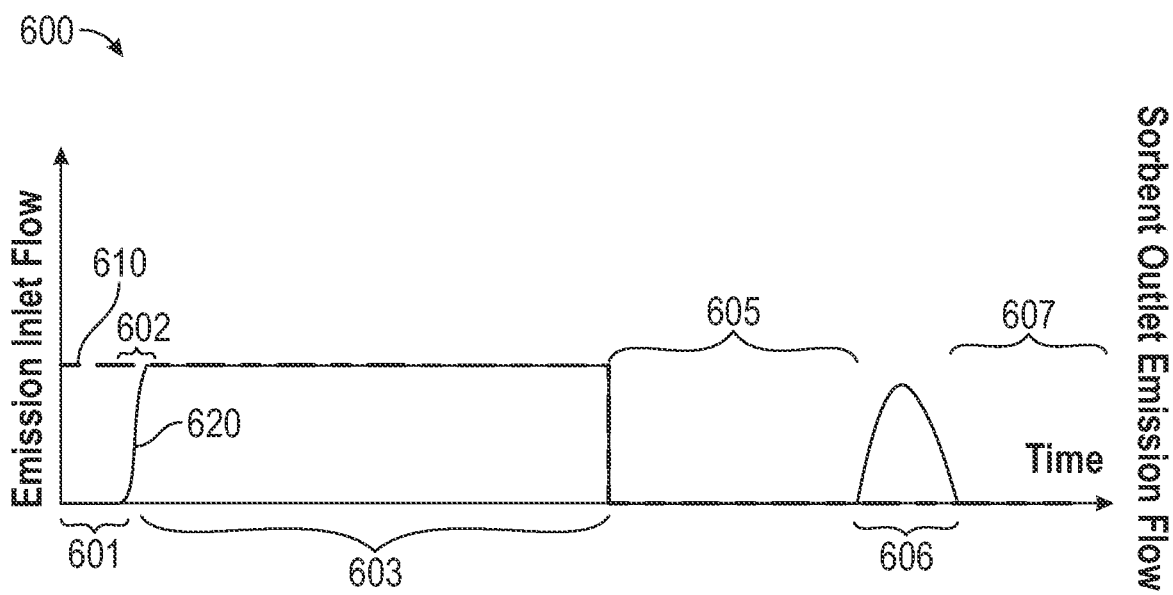
FIG. 6 is a graphical representation of an adsorption/desorption profile of a first sorbent, temperature, and an emission stream versus time in accordance with one or more embodiments.

In one or more embodiments, the first sorbent may be selected based on a first sorbent adsorption/desorption profile 600, an example of which is shown in FIG. 6. In region 601, a single molecule gas injection 610 is introduced to a first sorbent. A first sorbent outlet emission 620 may be monitored. An injected molecule from the single molecule gas injection 610 may adsorb on to strong storage sites of the first sorbent while temperature is held constant in region 602. The injected molecules may be adsorbed by strong storage sites until the storage capacity of the first sorbent is achieved in region 603. Once the first sorbent is fully saturated in region 603, the single molecule gas injection 610 and the first sorbent outlet emission 620 are equal. In such embodiments, some injected molecules are observed downstream of the first sorbent.

As shown in region 605 of FIG. 6, measured first sorbent outlet emission 620 drops simultaneously with the emission stream. As the temperature remains constant, molecules remain adsorbed onto the strong storage sites. With an increase in temperature in region 606, a peak corresponding to the desorption of molecules from strong storage sites is observed. Eventually, molecules may be released such that the strong storage sites of the first sorbent are regenerated in region 607.

Figure 7:
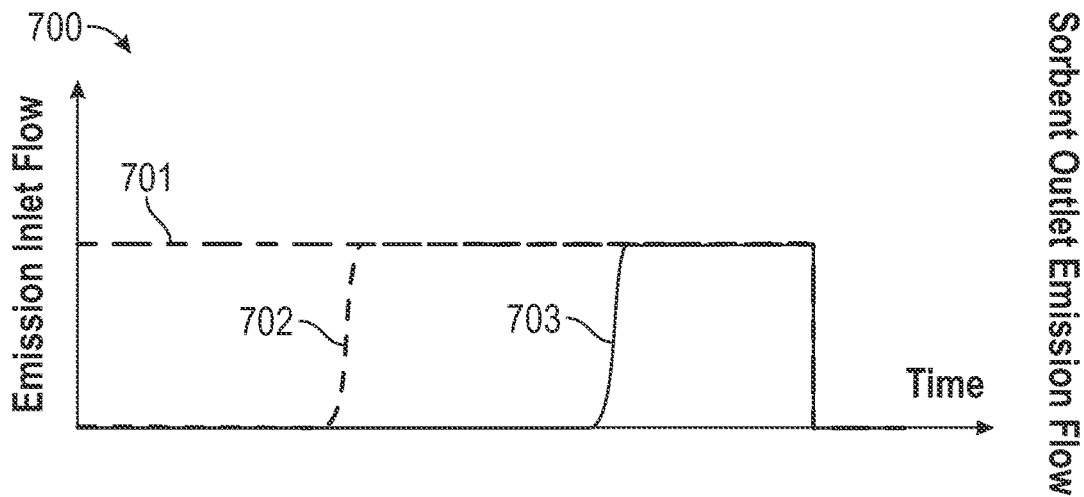
FIG. 7 is a graphical representation of an adsorption/desorption profile of a sorbent material upon exposure to an emission of a single molecule and an emission of a mixture of molecules in accordance with one or more embodiments.

In one or more embodiments, a sorbent material may be selected based on adsorption/desorption characteristics based on a mixture of gases. A non-limiting example of an adsorption/desorption profile 700 for a second sorbent material is shown in FIG. 7. Injection of a gas or a mixture of gases may be injected as indicated by line 701. Line 702 represents a monitored emission outlet of the second sorbent material upon exposure to a mixture of gases. Line 703 represents a monitored emission outlet of the second sorbent material upon exposure to a single gas. The mixture of molecules in the gas may saturate the strong storage sites of the second sorbent material more rapidly as compared to an injection of a single molecule material.

Method of Operating an Exhaust Treatment System

Figure 8:
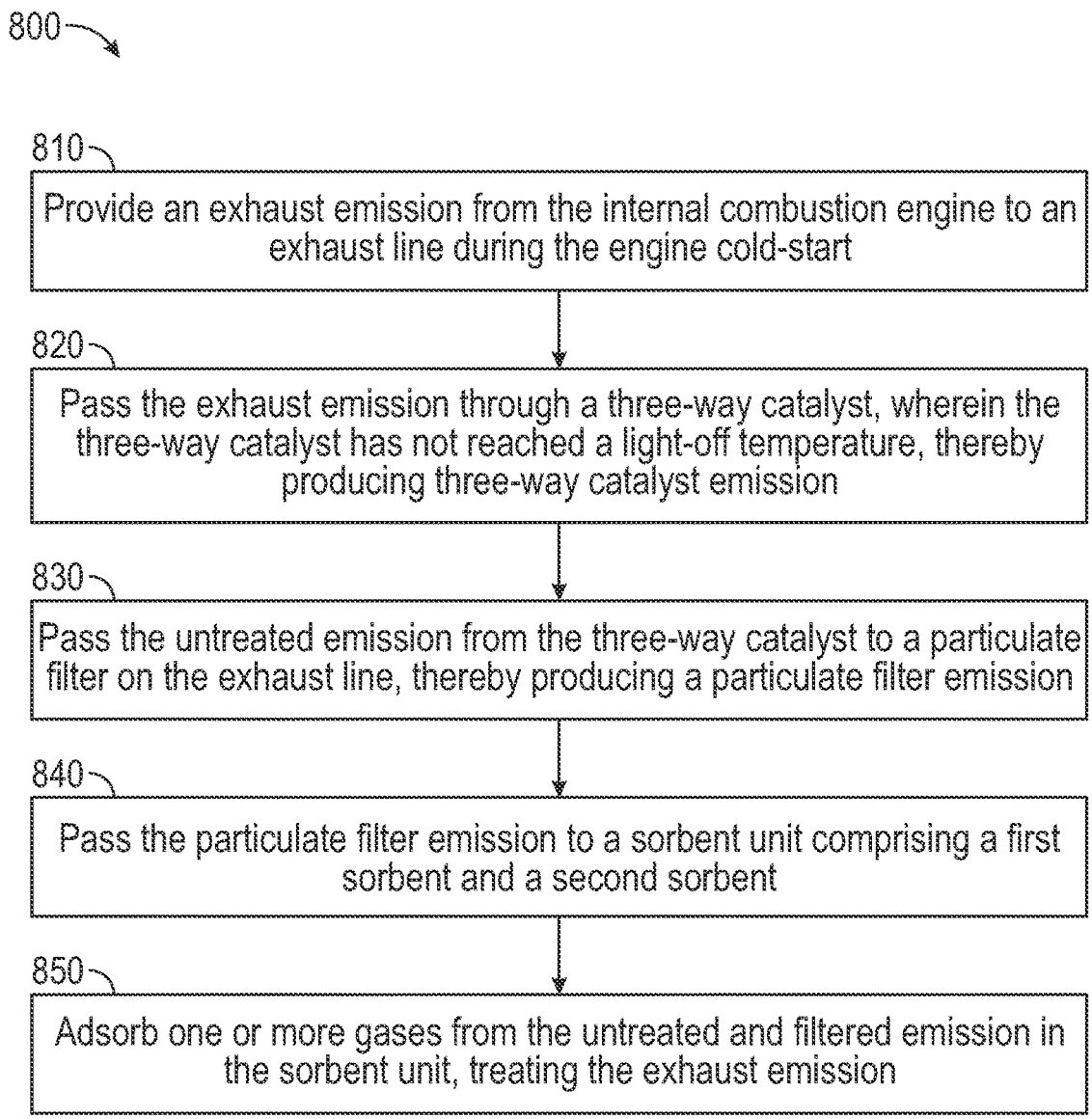
FIG. 8 is a block flow diagram of a method of operating an exhaust treatment system in accordance with one or more embodiments.

One or more embodiments relate to methods of operating an exhaust treatment system described above. In one or more embodiments, the methods of operating the exhaust treatment system include treating an exhaust emission from an internal combustion engine. The methods of treating an exhaust gas may be performed during an engine cold-start phase. FIG. 8 is a block flow diagram of an exemplary method 800 of treating an exhaust emission in accordance with one or more embodiments.

As shown in step 810, the method 800 may include providing an exhaust emission from the internal combustion engine to an exhaust line during the engine cold-start. Step 820 of method 800 includes passing the exhaust emission through a three-way catalyst. In one or more embodiments, a temperature of the three-way catalyst may be at or above a light-off temperature.

In one or more embodiments, the three-way catalyst has not reached a light-off temperature. In such embodiments, the three-way catalyst may trap and convert the exhaust at a conversion efficiency below about 50%, or below about 40% or below about 30%, or below about 20%, or below about 10%.

In one or more particular embodiments, passing the exhaust emission through the three-way catalyst produces a three-way catalyst emission. In one or more embodiments, the three-way catalyst emission may be an untreated emission, a partially treated emission, or a treated emission as defined above.

In step 830, the partially treated or untreated emission may be passed from the three-way catalyst to a particulate filter on the exhaust line. In one or more embodiments, the particulate filter may filter out particulate matter from the three-way catalyst emission as described above. In such embodiments, passing the three-way catalyst emission through the particulate filter produces a particulate filter emission.

Step 840 includes passing the particulate filter emission to a sorbent unit. The sorbent unit includes a first sorbent and a second sorbent as described above. The sorbent unit may further include a third sorbent. In one or more embodiments, passing the particulate filter emission to the sorbent unit includes passing the particulate filter emission to a bypass line in fluid communication with the exhaust line. In one or more embodiments, passing the particulate filter emission to the bypass line includes measuring a temperature of the exhaust line proximate to an inlet of the three-way catalyst via a first sensor. In such embodiments, a temperature measurement may be transmitted to an electronic control unit as described above. Passing the particulate filter emission to the bypass line may include measuring a pressure of the exhaust line via a second sensor as described above. In such embodiments, a pressure measurement may be transmitted to an electronic control unit as described above.

The electronic control unit may control the opening and closing of a bypass inlet valve, a bypass outlet valve, or both upon receiving a transmitted measurement from the first sensor, second sensor, or both. In one or more embodiments, the transmitting the temperature measurement includes activating the bypass inlet valve, thereby promoting a particulate filter emission to the bypass line.

As shown in step 850, the sorbent unit may adsorb one or more gases, such as gaseous pollutants, from the particulate filter emission. Adsorbing the one or more gases may include adsorbing the one or more compounds on the first sorbent and/or the second sorbent. In one or more embodiments, the adsorbing the one or more gases includes adsorbing one or more compounds on the first sorbent, the second sorbent, the third sorbent, or combinations thereof, thereby treating the exhaust emission to remove gaseous pollutants.

EXAMPLES

Materials and Methods

Characterization studies were performed to evaluate storage capacity and desorption temperature of some single adsorbents on gaseous pollutants, and dual sorbent systems. Sorbent materials CuZSM5 zeolite (copper-exchanged CZp 30 obtained from Clariant) and activated carbon (NORIT® 3070D NORIT Activated Carbon) were each characterized using experimental toluene adsorption/desorption studies including synthetic gas bench and flow gas bench tests.

The adsorption phase experiments were performed using synthetic gas bench and flow gas bench equipment at different temperature, namely 25° C., 50° C., and 150° C., until reaching saturation for each molecule of pollutant present in the gas stream. Then, the sorbent material was flushed under a flow of nitrogen gas ($N_2$) flow of 4.94 nL/min (nanoLiters per minute), thereby purging residual pollutants. The desorption of molecules from the sorbent may also be measured with zero partial pressure. Finally, temperature programmed desorption (TPD) was performed under the same $N_2$ flow rate and heating from the adsorption temperature to 600° C. at a heating rate of 10° C./min (degrees Celsius per minute) to ensure the complete desorption, thereby cleaning the adsorption material.

Dual sorbent systems were characterized using a computational model. The computational model was developed using values determined from the adsorption/desorption experiments described above. For example, the number of storage sites were determined by analyzing the desorption profile for each storage temperature. The total storage capacity during adsorption and TPD phases were then evaluated, along with the storage capacity of each storage site. The desorption parameters of each site, such as $$E_{a_{des_i}}, \alpha_i \text{ and } k_{0_{des_i}},$$

and the adsorption parameter $$k_{0_{ads_i}}$$

were then calculated using equations described above. If available, values from literature can be used, or an algorithm has been developed to find the most accurate values for fitting the desorption curve.

Figure 9:
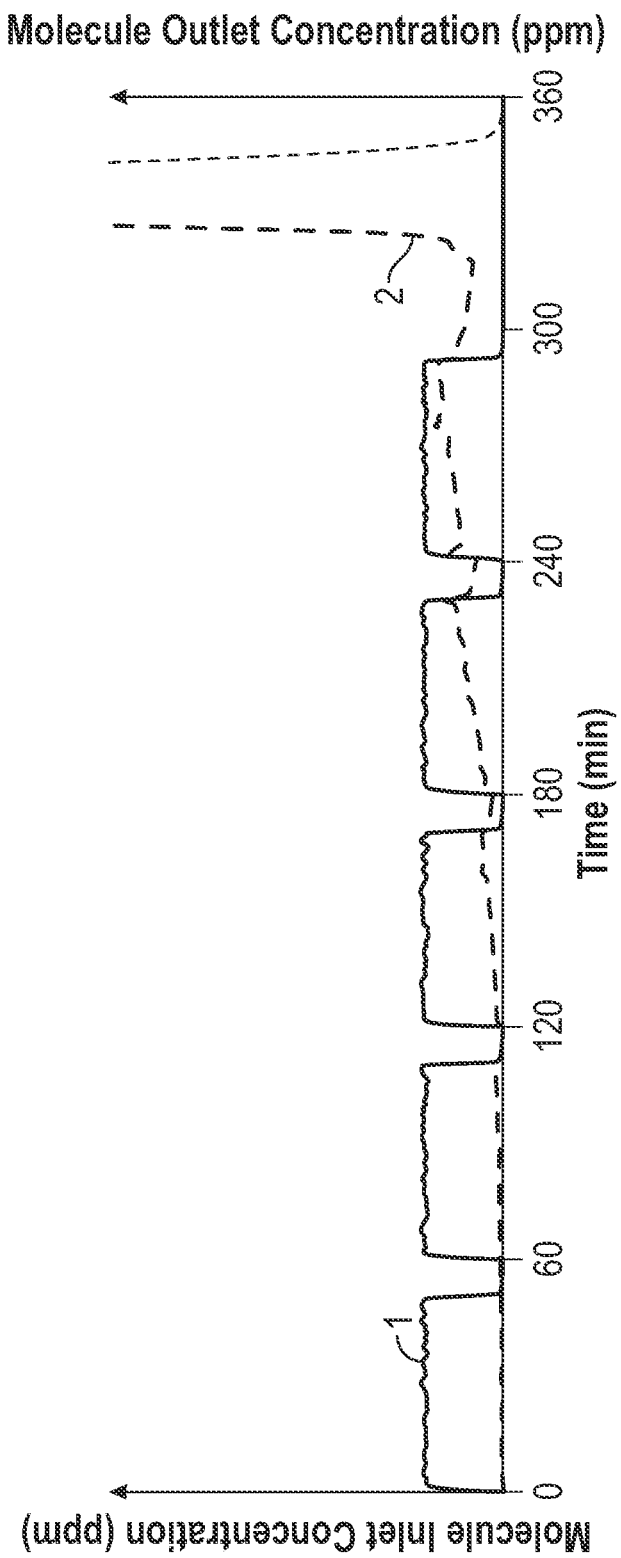
FIG. 9 is a predicted adsorption/desorption profile of activated carbon upon exposure to toluene in accordance with one or more embodiments.
Figure 10:
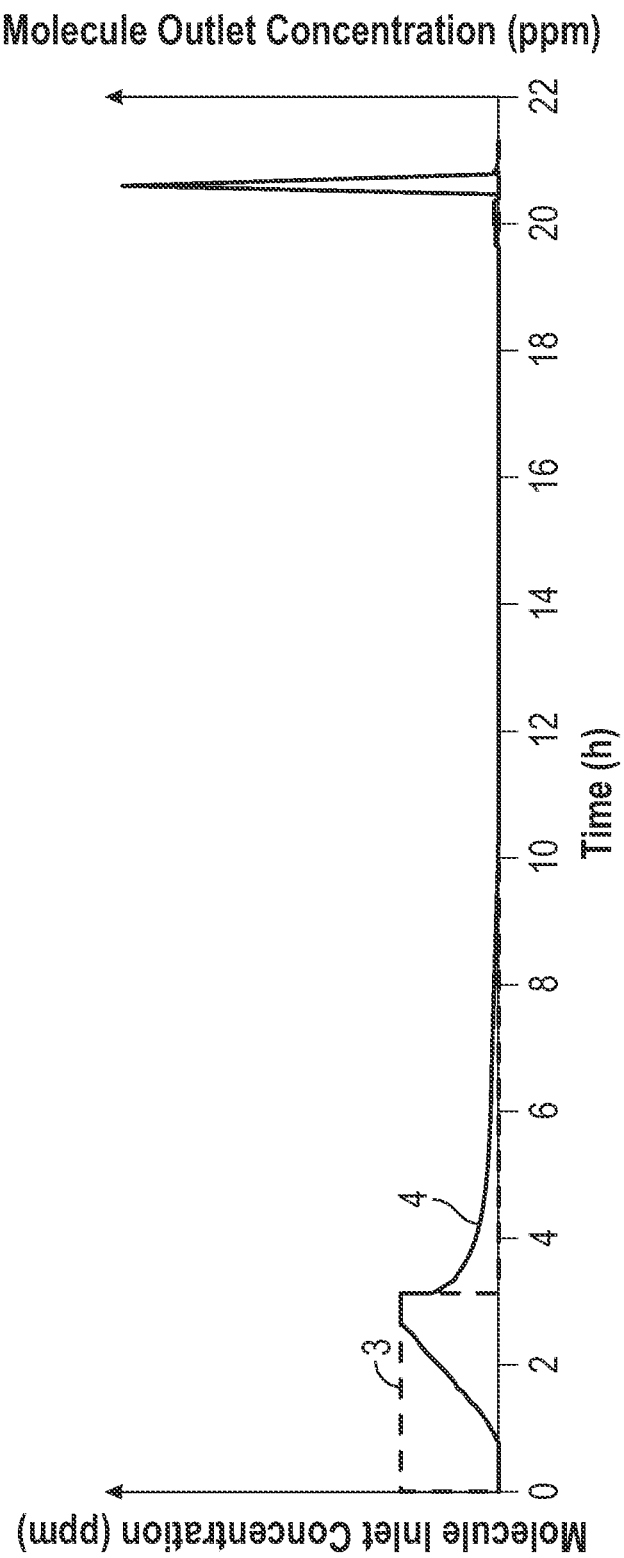
FIG. 10 is a predicted adsorption/desorption profile of saturated activated carbon upon exposure to toluene in accordance with one or more embodiments.

FIG. 9 is a graph of an adsorption/desorption profile (represented by line 2) of an activated carbon upon exposure to an alternating flow of toluene as represented by line 1. Line 2 of FIG. 9 resembles a first sorbent profile with large storage capacity as described above, in which saturation is gradually achieved with multiple toluene injection cycles. Storage capacity of the weak storage sites of activated carbon were also estimated by measuring the desorption (represented by line 4) once the material is saturated by a flow of toluene (represented by line 3) at constant temperature as shown in FIG. 10. From FIG. 9 and FIG. 10, it can be determined that activated carbon is a suitable candidate for a first sorbent of a sorbent unit.

Figure 11:
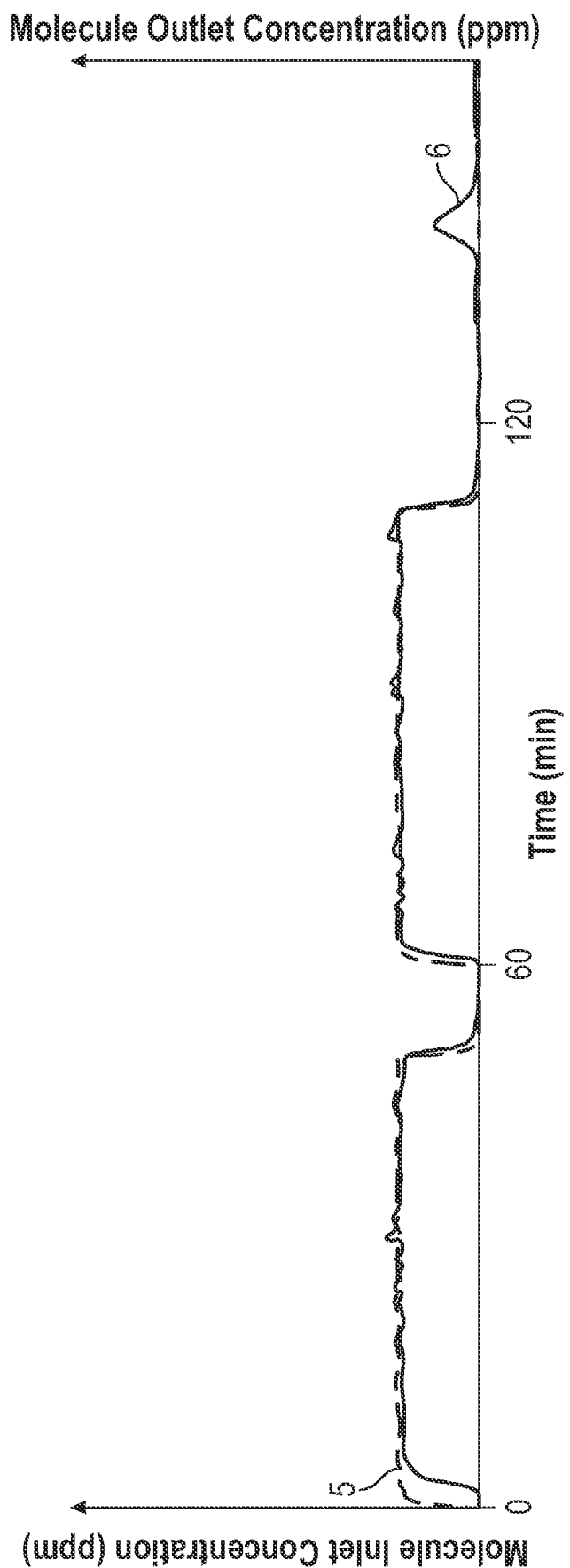
FIG. 11 is a predicted adsorption/desorption profile of CuZSM5 upon exposure to toluene in accordance with one or more embodiments.

FIG. 11 is a graph of an adsorption/desorption profile of a CuZSM5 zeolite (represented by line 6) upon exposure to a flow of toluene (represented by line 5). As described above, the profile of a CuZSM5 zeolite upon exposure to toluene resembles the profile for a second sorbent. It was determined that CuZSM5 has a lower storage capacity with strong storage sites due to its particular sorption profile.

Figure 12:
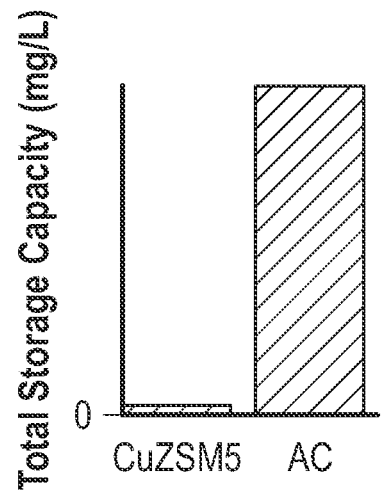
FIG. 12 is a bar graph of the total storage capacity of CuZSM5 as compared to activated carbon in accordance with one or more embodiments.

FIG. 12 is a bar graph of the total storage capacity of CuZSM5 as compared to activated carbon. As shown, activated carbon is estimated to have a larger storage capacity. The storage capacity of each material was calculated using the adsorption/desorption profiles from the synthetic gas bench and flow gas bench experiments via integration of outlet and inlet values.

Figure 13:
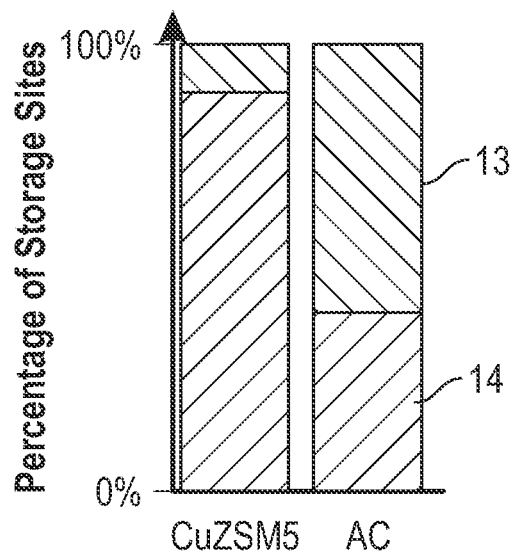
FIG. 13 is a bar graph of the ratio of strong to weak storage sites of CuZSM5 as compared to activated carbon in accordance with one or more embodiments.

FIG. 13 is a bar graph of the percentage of strong to weak storage sites of CuZSM5 as compared to activated carbon. The CuZSM5 zeolite was determined to have a higher percentage of strong to weak storage sites as compared to activated carbon.

Figure 14:
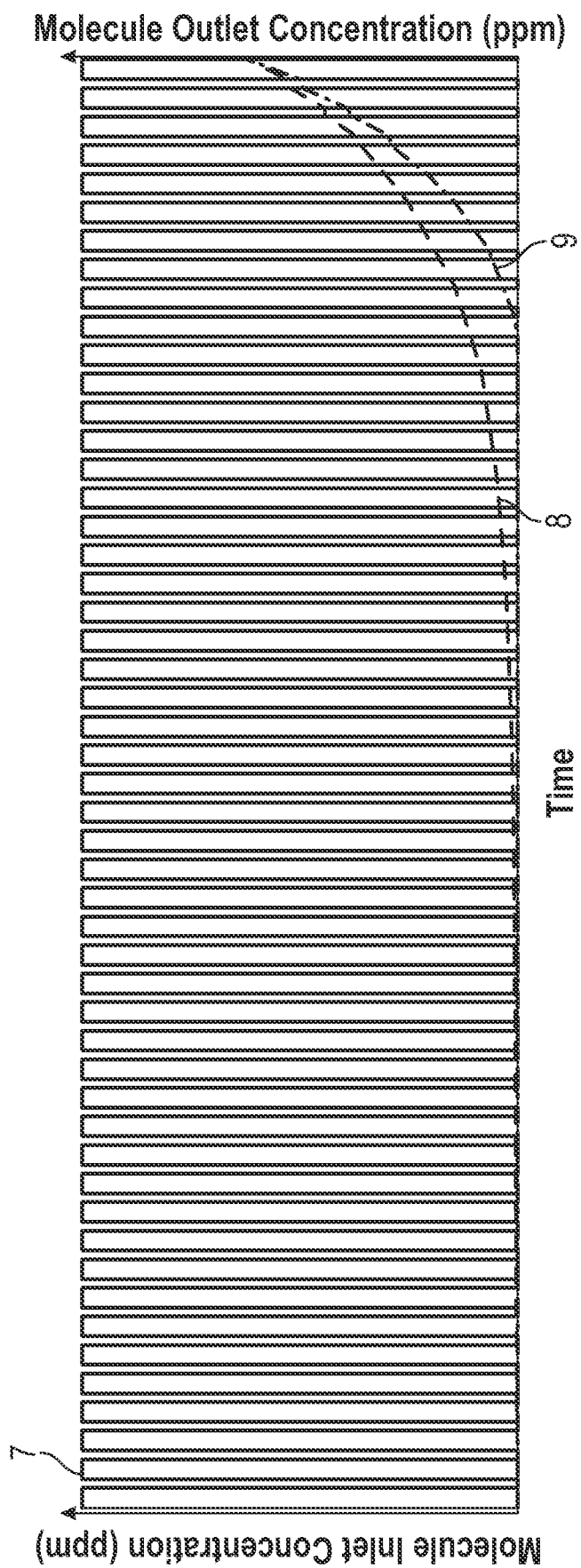
FIG. 14 is a predicted adsorption/desorption profile of toluene adsorption on a CuZSM5-Activated Carbon (AC) system and an Activated Carbon (AC)-CuZSM5 system in accordance with one or more embodiments.

From these adsorption/desorption profiles measured for each sorbent material, adsorption/desorption profiles were estimated for toluene and n-pentane for dual sorbent systems. For example, toluene adsorption was evaluated via modelling of an adsorption/desorption emission profile upon exposure to a flow of toluene represented by line 7 of FIG. 14. An adsorption/desorption emission profile of a CuZSM5-Activated Carbon (AC) dual sorbent system represented by line 8, in which CuZSM5 was the first sorbent, and the second sorbent was activated carbon is also shown in FIG. 14. Additionally, an adsorption/desorption emission profile results upon exposure to toluene for dual sorbent system Activated Carbon (AC)-CuZSM5 (represented by line 9), in which AC was the first sorbent, and CuZSM5 was the second sorbent is also presented in FIG. 14. From these modelling experiments, it was determined that the storage capacity of the AC-CuZSM5 was increased relative to CuZSM5-AC as the outlet value for AC-CuZSM5 is closer to zero for a longer period of time.

Figure 15:
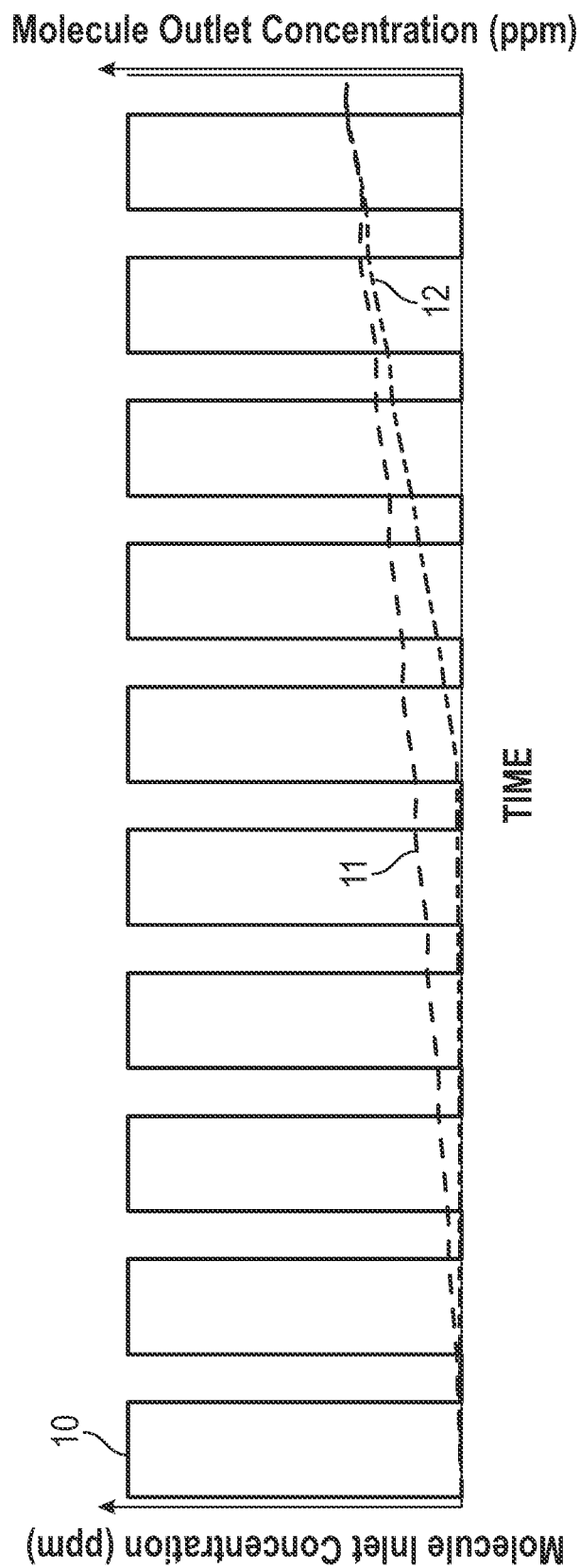
FIG. 15 is a predicted adsorption/desorption profile of n-pentane adsorption on a CuZSM5-Activated Carbon (AC) system and an Activated Carbon (AC)-CuZSM5 system in accordance with one or more embodiments.

Similar results were obtained when the sorbent systems were evaluated with exposure to a flow of n-pentane represented by line 10 as shown in FIG. 15. Lines 11 and 12 represent dual sorbent systems CuZSM5-AC and AC-CuZSM5, respectively. As demonstrated in FIG. 14, described above, AC-CuZSM5 was determined to have a larger storage relative to CuZSM5-AC as the outlet value for AC-CuZSM5 is closer to zero for a longer period of time.

Competitive adsorption of hydrocarbons on a commercial catalyst were also evaluated experimentally to evaluate the storage efficiency of the commercial catalyst as a third sorbent. The commercial catalyst was an automotive serial catalyst obtained from Johnson Matthey. Only the storage function was employed for experimental evaluation as the catalyst function (i.e., platinum group metals) was not used for these experiments. In these experiments, the relative amounts of ethylene adsorbed on to the catalyst were compared to evaluate adsorption efficiency of a target emission, such as ethylene, in the presence and absence of other small molecule hydrocarbons.

Thus, the adsorption of ethylene on the commercial catalyst was characterized. In addition, adsorption of ethylene included in a mixture with acetylene and ethylene, which is representative of an emission mixture, such as an untreated and filtered emission as described above, was also characterized on the commercial catalyst.

Figure 16:
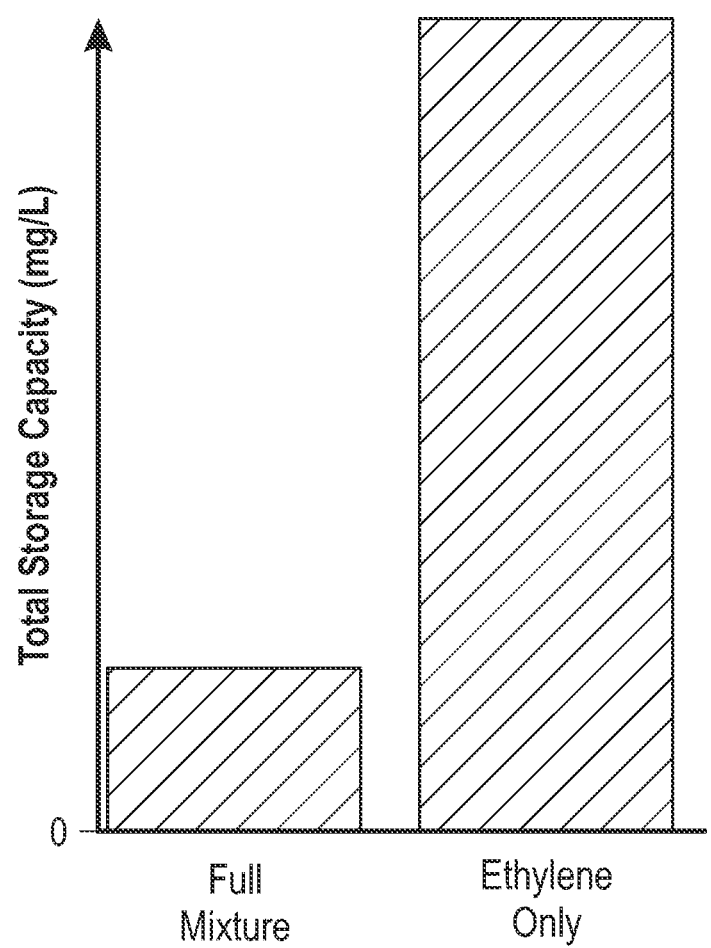
FIG. 16 is a bar graph of the total storage capacity of a commercial catalyst evaluated with exposure to a mixture of gases including ethylene and only ethylene in accordance with one or more embodiments.

Comparative results are displayed in FIG. 16. The storage capacity for ethylene on the commercial catalyst is significantly decreased in the presence of an emission mixture. However, when exposed to a mixture of only ethylene, the storage capacity of the commercial catalyst significantly increases. Therefore, the commercial catalyst may be included in the sorbent unit as a third sorbent material to trap small molecules, such as small hydrocarbon molecules like ethylene, that may be released due to the competitive molecules of an untreated emission.

Embodiments of the present disclosure may provide at least one of the following advantages. In one or more embodiments, an exhaust treatment system may reduce or prevent the release of gaseous pollutants, including regulated pollutants. In such embodiments, the reduction of gaseous pollutants may improve air quality. In one or more embodiments, the systems and methods of the present disclosure may reduce non-methanic hydrocarbons (NMHCs) and ammonia emissions of an internal combustion engine.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of treating an exhaust emission from an internal combustion engine during an engine cold-start, the method comprising:
    providing an exhaust emission from the internal combustion engine to an exhaust line during the engine cold-start;
    passing the exhaust emission through a three-way catalyst, wherein the three-way catalyst has not reached a light-off temperature, thereby producing a three-way catalyst emission;
    passing the three-way catalyst emission from the three-way catalyst to a particulate filter on the exhaust line, thereby producing a particulate filter emission;
    passing the particulate filter emission to a sorbent unit comprising a first sorbent, a second sorbent, and a third sorbent arranged in series to produce an untreated and filtered emission, wherein the first sorbent, the second sorbent, and the third sorbent comprise an adsorbent material selected from the group consisting of a zeolite, activated carbon, and combinations thereof; and
    adsorbing one or more gases from the untreated and filtered emission in the sorbent unit, thereby producing an adsorbed emission.

2. The method of claim 1, wherein passing the particulate filter emission to the sorbent unit further comprises passing the particulate filter emission to a bypass line in fluid communication with the exhaust line.

3. The method of claim 2, further comprising measuring a pressure of the exhaust line.

4. The method of claim 2, further comprising measuring a temperature of the exhaust line proximate to the three-way catalyst.

5. The method of claim 4, further comprising transmitting a temperature measurement to an electronic control unit.

6. The method of claim 5, wherein transmitting the temperature measurement comprises activating a bypass inlet valve and promoting a flow of emission to the bypass line.

7. The method of claim 1, wherein the adsorbing the one or more gases comprises adsorbing one or more compounds on the first sorbent, the second sorbent, the third sorbent, or combinations thereof.

* * * * *